Patented Oct. 2, 1951

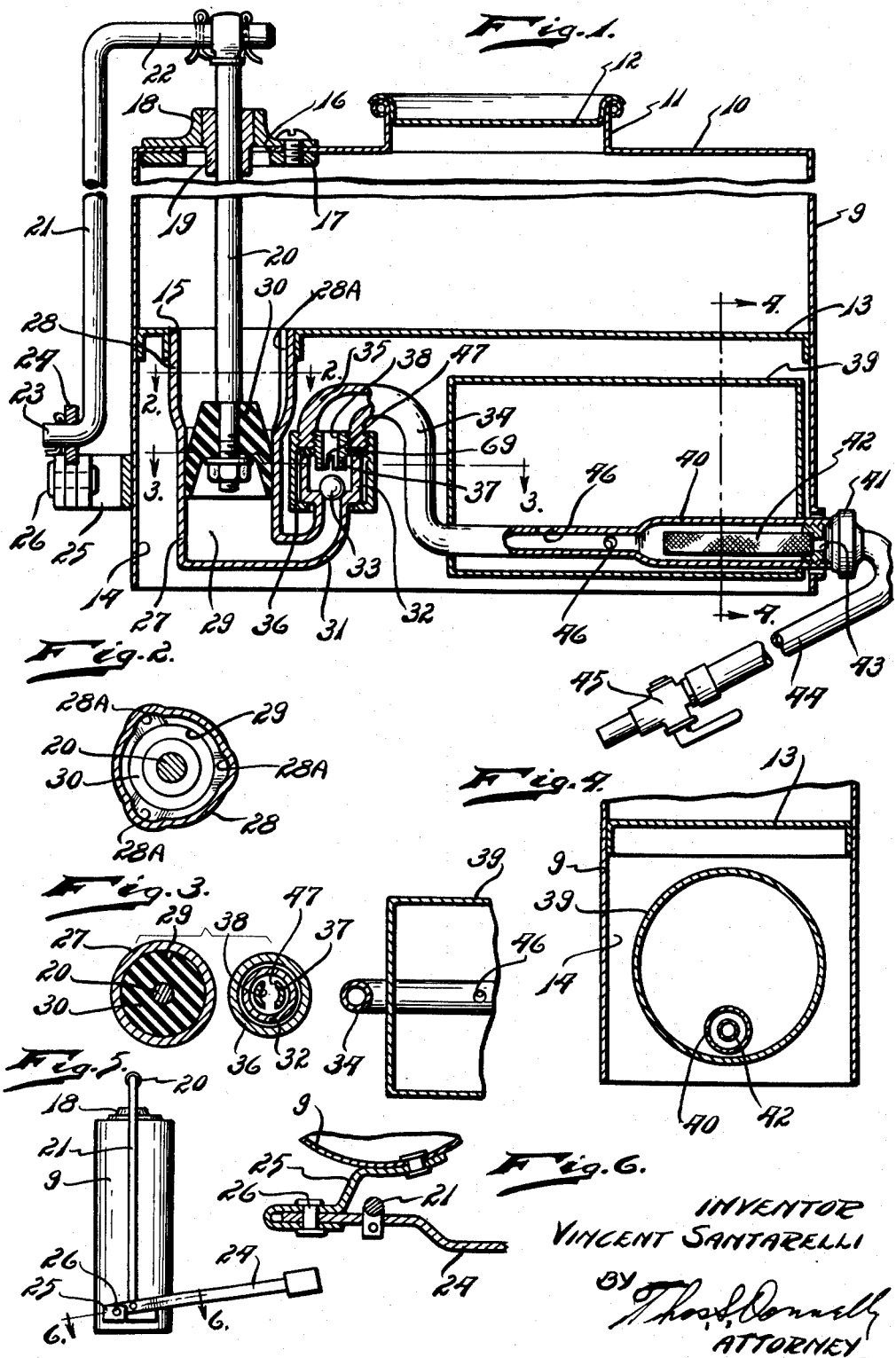

2,569,903

UNITED STATES PATENT OFFICE 2,569,903

SPRAYER

Vincent Santarelli, Detroit, Mich.

Application March 4, 1946, Serial No. 651,752

1 Claim. (Cl. 222—263)

My invention relates to a new and useful improvement in a sprayer adapted for use in spraying gardens and the like. It is an object of the present invention to provide a sprayer which will be simple in structure, economical to manufacture, durable, compact, easily operated and highly efficient in use.

Another object of the invention is the provision of a sprayer in which a pressure tank is used so arranged and constructed so that a back flow from the pressure pipe is prevented and a constant stream of liquid is afforded.

Another object of the invention is a provision in a sprayer of this class of a liquid receiving air pressure tank so arranged and constructed that the air which is under pressure cannot escape regardless of the position the sprayer may be in when in normal use.

Another object of the invention is a provision in a sprayer of a liquid container having a pump for forcing liquid therefrom into a receiving chamber from which the liquid issues under air pressure and provided with a trap between the pump and the pressure chamber.

Other objects will appear hereinafter.

It is recognized that various modifications and changes may be made in the detail of structure illustrated without departing from the invention itself and it is intended that such variations and modifications shall be embraced within the scope of the claim which forms a part hereof.

Forming a part of the application are drawings in which,

Fig. 1 is a longitudinal, vertical, central sectional view of the invention with parts broken away, Fig. 2 is a sectional view taken on line 2—2 of Fig. 1, Fig. 3 is a fragmentary sectional view taken on line 3—3 of Fig. 1, Fig. 4 is a sectional view taken on line 4—4 of Fig. 1, Fig. 5 is a side elevational view of the invention reduced in size, Fig. 6 is a fragmentary sectional view taken on line 6—6 of Fig. 5, slightly enlarged.

In the drawings I have illustrated a liquid receiving tank 9 having a top 10 in which a filling opening is formed and which is closed by a suitable removable closure or cap 12. The bottom 13 of the container or tank is positioned inwardly from the lower edges of the walls of the container so as to provide an open compartment 14 below the bottom 13. Formed in the bottom 13 is an opening 15. Opening 16 is formed in the top 10 and reinforced on the under side with a reinforcing ring 17 and provided with a plate 18 on the outer face of the top 10 in which is mounted a suitable packing bushing 19. Slidably projected through this bushing 19 is a pump rod 20. A rod 21 is angularly turned to provide the portion 22 which is fastened to the upper end of the pump or plunger rod 20. The opposite end of this rod 21 is angularly turned as at 23 and projected through the rockable lever 24 which is pivotally mounted on the bracket 25 extending outwardly from the lower portion of the container or tank 9. A pin 26 serves to pivotally mount the lever 24 on the bracket 25.

Mounted in and projecting downwardly from the opening 15 of bottom 13 is a plunger housing 27 having the enlarged portion 28 and a lower restricted portion 29 in which the plunger 30 snugly engages. The enlarged portion is also provided with the axially directed grooves 28a so that when the plunger 30 is raised into the enlarged portion of the housing water may freely flow around the plunger 30 into the lower portion of the housing 27 from which it may pass through the tube or pipe 31. A cup shaped housing 32 forms the terminus of the tube or conduit 31 and seated in this housing 32 is a ball valve 33. A tube 34 is provided with a head 35 which is externally threaded and on which is threaded the retaining cup 36 which serves to bind the head 35 and the cup shaped housing 32 in clamping relation with a sealing gasket 69. Threaded into the head 35 and projected through an opening in the gasket 69 so as to extend into the cup shaped housing 32 is a fitting 37 having a passage 38 formed therethrough and provided on its lower edge with diametrically opposite slots 47.

The tube or conduit 34 extends into the air pressure chamber 39 which is mounted on the tank 9 below the bottom 13 in the open compartment 14. This conduit or pipe 34 is provided with the enlarged portion 40 within the air pressure chamber 39. Threaded onto the end of this enlarged portion 40 is a fitting 41 which carries the inwardly projecting tubular or cup shaped screened filtering member 42 which communicates with the passage 43 formed through the fitting 41 and communicating with the flexible conduit 44 which is attached to the fitting 41 and in which is interposed a manually operable control valve 45. Openings 46 are provided in the pipe or conduit 34 within the air pressure chamber 39.

In operation water and suitable powder insecticides are placed in the tank or container 9 and thoroughly mixed. The pump is then operated to force the water from the tank 9 through the pipe 31 into the cup shaped housing 32 and in this operation the ball valve 33 lifts off its seat. The mixture so forced into the cup shaped member 32 then passes through the conduit 34 into the interior of the air pressure chamber 39 which is formed airtight. This liquid passes outwardly through the openings 46 so that the same is deposited in the air pressure chamber 39. As a quantity of liquid rises in the air pressure chamber 39 it is obvious that the air above the liquid will be placed under pressure so that when the valve 45 is opened the liquid will be forced outwardly through the hose or conduit 44 in a steady uninterrupted stream regardless of the intermittent operation of the pumping mechanism. The operator would, of course, continue to pump so long as the liquid is issuing from the conduit 44 so that a quantity of liquid in the air pressure chamber 39 would be maintained substantially constant. In this manner a constant air pressure on the liquid issuing from the conduit 44 would be obtained.

It will be noted that the member 34 extends upwardly and that this portion of the member 34 is above the normal liquid level in the pressure tank 39 so that there is thus provided a water trap between the pump housing 27 and the air pressure chamber 39. The outlet openings 46 are located adjacent one end of the air pressure chamber 39 away from the outlet end. The purpose of this is to prevent the air under pressure backing through the conduit 34. Should the tank be tilted from the vertical in either direction the quantity of liquid in the air pressure tank 39 would be sufficient to reach one of the openings 46 and flow backwardly into the trap provided. Consequently, the air pressure operating rearwardly in the conduit 34, upon a tilting of the tank 9 from the vertical would always be resisted by a quantity of water which would be positioned between the air pressure tank 39 and the pump housing 27. Experience has shown that this is a very efficient seal against air leakage and the losing of pressure in the air tank, which is a common disadvantage in air pressure tanks associated with a pumping mechanism of this class, is avoided, thus considerably increasing the efficiency of the device.

What I claim as new is:

A sprayer of the class described comprising a liquid receiving tank; a bottom on said tank positioned upwardly from the lower edges of said tank to provide a compartment below said bottom, said bottom having an opening formed therein; a pump housing communicating through said opening with the interior of said tank and positioned in the said compartment; a pump plunger for forcing liquid from said tank into said pump housing; a conduit communicating with said pump housing for conducting liquid therefrom and upwardly from the bottom thereof; a housing on said conduit positioned above the bottom of said pump housing and communicating with said conduit; a valve in said housing on said conduit for controlling flow on liquid through said conduit in one direction; a head mounted on said last named housing; a tubular conduit communicating through said head with said last named housing and extending upwardly from said head and thence downwardly and angularly turned; an air pressure chamber enclosing the angularly turned portion of said tubular conduit, said tubular conduit having openings formed therein communicating with said air pressure chamber below the normal water level thereof, said air pressure chamber being positioned below said bottom in said compartment; and an outlet conduit communicating with said tubular conduit for conducting liquid therefrom to the exterior of said air pressure tank.

VINCENT SANTARELLI.

REFERENCES CITED

The following references are of record in the file of this patent:

UNITED STATES PATENTS

| Number | Name | Date |
|---|---|---|
| 489,780 | Albinson | Jan. 10, 1893 |
| 506,708 | Middleton | Oct. 17, 1893 |
| 685,586 | Ellis | Oct. 29, 1901 |

FOREIGN PATENTS

| Number | Country | Date |
|---|---|---|
| 78,386 | Switzerland | July 16, 1918 |
| 176,781 | Germany | Oct. 19, 1906 |
| 283,607 | Germany | Apr. 21, 1915 |
| 297,239 | Italy | June 7, 1932 |
| 751,429 | France | June 19, 1933 |
| 808,183 | France | Nov. 6, 1936 |